United States Patent Office 3,247,901
Patented Apr. 26, 1966

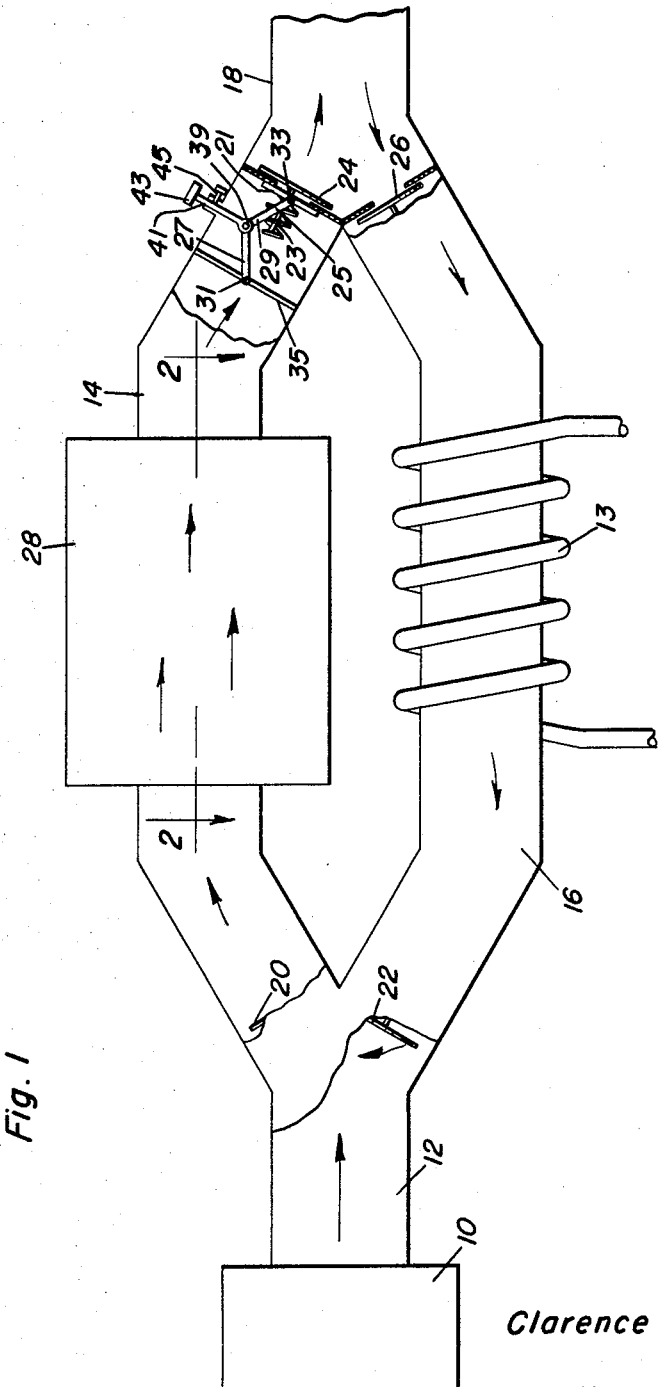
April 26, 1966  C. W. BRANDON  3,247,901
METHOD AND APPARATUS FOR FORMING AND/OR
AUGMENTING AN ENERGY WAVE
Original Filed May 20, 1954  3 Sheets-Sheet 1
Clarence W. Brandon
INVENTOR.

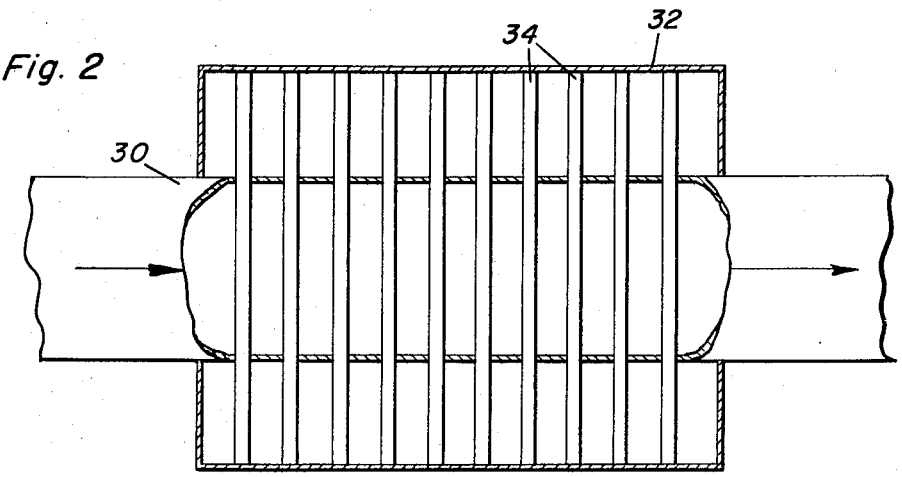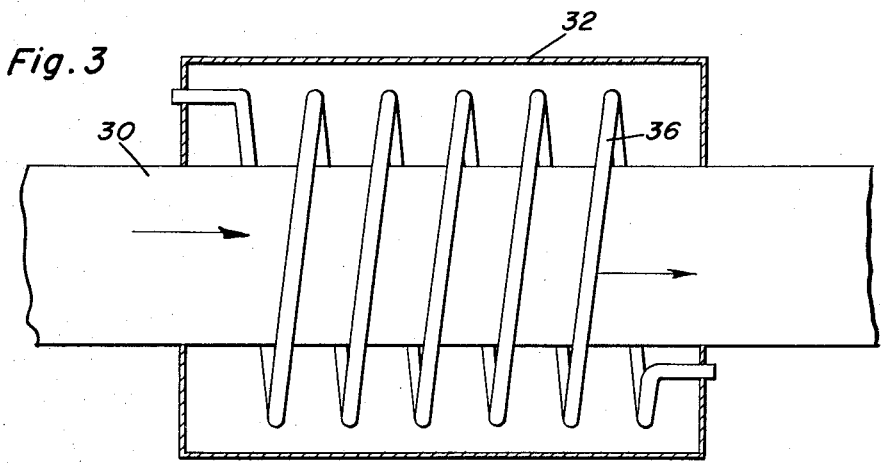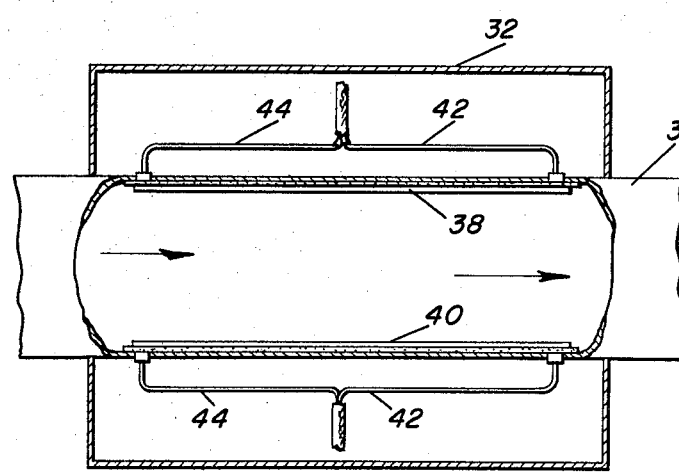

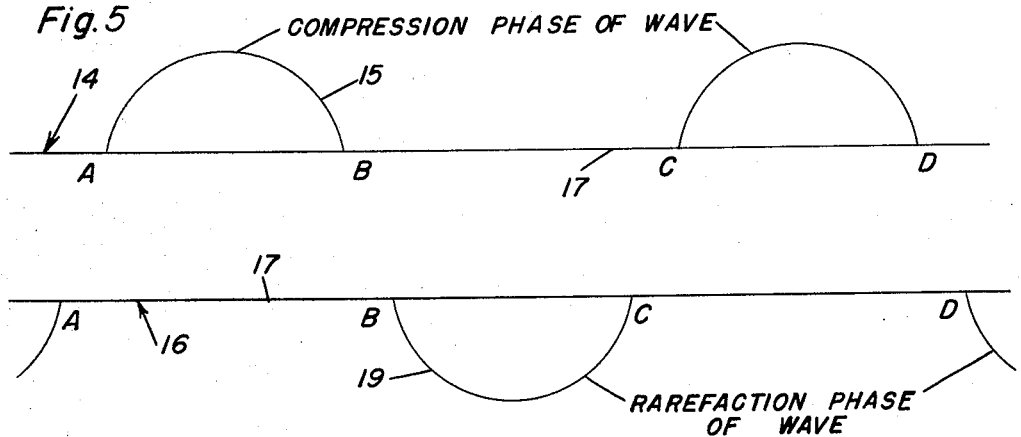

3,247,901
METHOD AND APPARATUS FOR FORMING AND/
OR AUGMENTING AN ENERGY WAVE
Clarence W. Brandon, Tallahassee, Fla., assignor of five percent to Harvey B. Jacobson, Washington, D.C., and fifty percent to N. A. Hardin, Catherine H. Newton, and Hazel H. Wright, jointly, all of Forsyth, Ga., and twelve and one-half percent to Orpha B. Brandon
Original application May 20, 1954, Ser. No. 431,246, now Patent No. 3,133,591, dated May 19, 1964. Divided and this application Apr. 28, 1964, Ser. No. 376,285
18 Claims. (Cl. 166—40)

This application is a division of prior copending application Serial Number 431,246, now Patent Number 3,133,591, and relates to prior copending applications which have matured into United States Patents Numbers 2,796,129; 2,866,509; 2,689,461; 2,689,462; 3,042,115 and application Serial Number 431,388, filed May 21, 1954, now abandoned.

The present invention relates to methods and apparatuses for forming and/or augmenting an energy wave and more specifically has reference to processes and means whereby heat energy may be directly introduced into a fluid medium or into a pulsating energy wave in a wave propagating medium; or may be abstracted therefrom and converted into heat or mechanical energy.

It is axiomatic, as stated by generally recognized authorities in the study of the wave transmission of energy in a wave propagating medium, that heat applied to an energy carrying wave medium during the compression phase of an energy carrying wave therein, or abstracted during the rarefaction phase, will increase the energy content of the wave by that amount; while the application of heat during the rarefaction phase or its abstraction during the compression phase will decrease the wave energy content to that extent. The present invention is concerned with and based upon this fundamental principle of wave mechanics.

In its broadest aspect therefore, the basic and fundamental purpose of this invention is to provide means and methods whereby energy in the form of sensible heat may be directly introduced into an energy-carrying wave in order to augment or modify the total energy content of the energy wave or to otherwise modify or control its characteristics; and, alternatively, to abstract heat or mechanical energy from an energy-carrying wave.

A corollary object is to apply the foregoing object and principle to the recovery of gases and oils from petroliferous formations.

A further object of the invention is to provide means and methods whereby an energy-carrying wave in a wave propagating medium may be maintained by replenishing its energy losses or withdrawals through the input of additional energy into the wave in the form of heat applied thereto.

An additional important object of the invention is to provide a means and method in accordance with the preceding objects whereby the energy of heat and the mechanical energy of a energy wave may be readily interchanged and converted.

An important, more specific object of this invention is to provide apparatuses and processes whereby heat energy may be introduced into an oil formation to facilitate the recovery of oil therefrom and to control the flow of fluids and gases in the formation by means of energy-bearing waves propagated in the formation.

A further and subordinate object of this invention, in accordance with the preceding objects, is to provide apparatuses and processes whereby liquefiable gases may be introduced into oil-bearing formations for facilitating the heating of the formation through the application of energy-bearing waves therein.

An additional important specific object of the invention is to provide processes and means whereby the dielectric properties of a formation may be utilized for converting the energy content of an energy-carrying wave propagated in the formation into sensible heat released to the formation.

A still further important object of the invention, and in accordance with the immediately preceding object, is to provide apparatuses and processes whereby the dielectric properties of gaseous and/or liquid fluids in an oil bearing formation may be utilized to facilitate converting the energy content of an energy carrying wave propagated in the formation into sensible heat released in the formation.

Another object is to provide apparatuses and methods whereby the compression and rarefaction phases of an energy-carrying wave may be separated or split to permit heat energy to be added to or abstracted from a selected phase to thereby vary and control the energy content and characteristics of a wave.

An additional object is to devise apparatuses and methods whereby a constant emission of heat at a substantially uniform rate from a heat source may be continuously and uninterruptedly applied to a fluid medium and continuously introduced into an energy-carrying wave therein for selectively increasing or decreasing the energy content of the wave.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a diagrammatic view showing one manner in which the energy content of an energy wave in a wave transmitting medium may be increased by applying heat to the medium during the compression phase and/or withdrawing heat by refrigeration from the medium during the rarefaction phase of the wave;

FIGURES 2–4 are detail views in vertical longitudinal section, taken substantially upon the plane indicated by the section lines 2—2 of FIGURE 1 showing different constructions of heat exchangers and heat generators for introducing heat into an energy-transmitting wave in a wave-propagating medium;

FIGURE 5 is a diagrammatic view illustrating the operation of the embodiment of FIGURE 1.

In my prior co-pending applications, and subsequently issued patents there are disclosed and claimed processes and apparatuses for producing energy-bearing waves having predetermined characteristics in an energy-transmitting medium and for varying and controlling those characteristics; and especially for treating oil-bearing formations by such waves to facilitate the recovery of oil therefrom. Broadly disclosed in those applications are processes and apparatuses whereby the energy of the generated waves may be increased, controlled or modified by the application or withdrawal of sensible heat thereto.

The present application constitutes an improvement over these prior applications in that it discloses and claims specific processes and apparatuses for the converting of or withdrawal of heat energy into wave energy and for utilizing the latter.

*Embodiment of FIGURES 1 and 5*

An apparatus and method is diagrammatically disclosed in FIGURES 1 and 5 by means of which the energy content of an energy wave in a wave propagating medium may be maintained or may be controllably altered by the application of heat to the medium from a constant source of heat and/or by the withdrawal of heat from the medium by means of a constant source of refrigeration. This apparatus and method is effective to augment or diminish the energy content of an energy wave; to modify or control the characteristic of such a wave; to maintain a constant energy content of a wave despite inputs or withdrawals of energy therefrom.

Illustrated in FIGURE 1 is a generator 10 which may be of any type capable of generating an energy wave in a wave propagating machine, and which may satisfactorily be of the types disclosed or claimed in my prior applications and patents mentioned previously.

Acousticably or operatively connected to the wave generator 10 is a conduit 12 having a pair of branch conduits 14 and 16 disposed in parallel relation, the branch conduits in turn communicating with a further conduit 18 constituting a continuation of the conduit 12. This arrangement provides parallel or branch conduits which are directly connected with the energy wave generator 10. An energy wave propagating medium of any desired type, such as water, oil, gases or the like, fills the conduits 12, 14, 16 and 18.

At the junction of the conduits 14 and 16 with the conduit 12, there are provided non-return check valves 20 and 22, respectively, the former opening inwardly into the branch conduit 14, while the latter opens outwardly from branch conduit 16 into the conduit 12. At the opposite ends of the branch conduit, there are provided similar non-return check valves 24 and 26, the former opening in a direction to permit flow from the branch conduit 14 into the conduit 18, while the latter opens in a direction to permit flow from the conduit 18 into the branch conduit 16. These valves are preferably spring closed at any desired and/or at a regulatable tension in any conventional manner.

In order to adjustably vary the spring closing pressure on the check valves, any suitable device, such as that of FIGURE 1 may be employed. For the sake of simplicity of illustration, the adjusting means is illustrated only in connection with the valve 24, although it is understood that it may and usually will be applied to each of the other check valves.

The spring pressure adjusting device comprises a spring abutment plate 21 slidably received on the valve stem 23 and supporting an end of the spring 25 whose other end is fixed to the valve stem. A pair of toggle links 27 and 29 are pivoted at 31 and 33 to an anchor rod 35 suitably mounted in the conduit and to the abutment plate. At the hinge pin 39 of the toggle, a control rod 41 is pivoted, the latter extending through the wall of the conduit and having a control knob 43. Locking of the control rod in adjusted position is secured by the set screw arrangement 45.

Movement of the toggle hinge by the control rod will shift the abutment plate and thus secure a variable adjustment of the valve spring and of the closing pressure of the check valve.

Indicated diagrammatically at 28 is a heat exchange device which is disposed in direct heat exchange relation with the branch conduit 14. The exchanger is of any desired character, and may conveniently comprise any of the various embodiments referred to hereafter, whether of a continuous or of a variable rate of heat generation and/or emission; and whether of continuous or of an intermittent or periodically interrupted rate of heat flow. In particular, this form of the invention may be of a continuously generating and constant rate of heat emission type as in FIGURES 2–4.

A heat removing or refrigerating device, is indicated at 13, which may take the form of a coil surrounding and/or in direct heat exchange relation with the other branch conduit 16. The coil forms part of any conventional refrigerating device, not shown, and comprises a means for withdrawing heat from the medium in the conduit 16. Although the cooling device 13 may be of a type to continuously remove heat, either at a constant or variable rate, or with a continuous or intermittenly interrupted flow, it is particularly adapted for the same type of operation as the heating device 28.

It is believed that the method of operation of this embodiment of the invention is as follows, reference being made both to FIGURES 1 and 5, it being assumed that the device is arranged and intended to increase the energy content of a wave, although it may in some instances be arranged to decrease the energy content as set forth hereinafter.

When the energy-carrying wave produced in the conduit 12 by the generator 10 reaches the check valves 20 and 22, the compression phase of this wave opens the check valve 20, and thus subjects the medium in the branch conduit 14 to the compression phase of the wave. This compression phase travels through the conduit 14 at the speed at which the wave is propagated in the particular medium with which the conduits are filled, the curve 15 representing the pressures produced in the medium by the compression phase of the wave, and emerges through check valve 24 into the conduit 18. When the compression phase, however, hits the check valve 22, it is unable to open the same, and therefore does not pass into the branch conduit 16.

When the rarefaction phase, which follows the compression phase of the wave reaches the branch conduits, the check valves 20 and 24 close or remain closed; while the check valves 22 and 26 open in their turn and permit the rarefaction phase to pass through the conduit 18, the curve 19 representing the pressures produced in the medium by the passage of the wave through the branch conduit 16. The arrows in FIGURE 1 diagrammatically indicate the direction of the wave travel in the branch conduits.

The line 17 in FIGURE 5 represents the normal pressure in the medium of the two branch conduits, that is, the pressures prevailing between the peak pressures, whether compression or rarefaction. Although this has not been definitely established, it is believed that the pressures of each conduit is substantially uniform; and that they are substantially equal or at least at a constant relation or proportion in the two conduits. In any event, there is a periodic rise in pressure 15 above the normal 17, in the conduit 14 between the points A and B and again between C and D, these rises constituting the compression peaks or compression phases of the wave; while corresponding succeeding drops in pressure 19 below the normal 17 occurs in the branch conduit 16 between the points B and C.

The divided and separated compression and rarefaction phases of the energy wave, separated in the branch conduits to permit the addition thereto or the removal therefrom of energy are recombined at the valves 24 and 26 and the reconstituted split phases of the restored energy wave is then transmitted by the conduit 18 to its target or receiver.

It will probably be found desirable to form the branch conduits 14 and 16 of the same length as the wave being propagated by the generator 10; or equal to an integer multiple of the same and to originate the compression phase portion 15 or the rarefaction phase portion 19 of the wave at the valves 20 or 22. In any event, in the arrangement illustrated it is apparent that the compression phase portion of the wave, representing a higher wave pressure is maintained in the conduit 14 by the generator 10 than the rarefaction phase portion of the wave representing a lower wave pressure which is maintained in the conduit 16. Consequently, heat from the heat exchanger 28 introduced into the medium within the conduit 14 is directly introduced into the energy carrying wave itself since the latter is present only in its compression phase. Thus, the heat input from the exchanger 28 is directly introduced into the energy-carrying wave and serves to augment the energy content of the same; or to maintain the energy content at a desired level; or to modify or control the characteristics of the energy-carrying wave.

In a similar manner, heat is withdrawn from the medium by the cooling device 13 during the rarefaction phase of the wave, also increasing the energy content of the wave.

It will be now apparent that the operation of either of the heat exchange devices 28, 13, alone, will increase the energy content of the energy wave and that both of the devices 28, 13 may be simultaneously operated to obtain the maximum rate of energy increase in the wave energy content.

In the arrangement of FIGURE 1, it is possible for the wave transmitting medium itself to travel in the conduits. Thus, where the embodiment is employed in conjunction with a water drive for pressurizing an oil or gas bearing formation for recovering oil or gas from the same, the pressurizing fluid may travel from the conduit 12 through the conduit 14 and the conduit 18 to its destination. In such an arrangement it is possible to utilize the fluid medium in its pressurizing operation while imparting thereon an energy-carrying wave from the wave generator 10 and for introducing heat into the wave by the heat exchanger 28 and/or the cooler 13.

In this form of the invention, the characteristics of the branch conduits 14 and 16 are so chosen as to maintain the energy carrying wave in its compression phase in the branch conduit 14 and in its rarefaction phase in the branch conduit 16. This condition may be brought about by properly determining the relative lengths of the branch conduits; their shapes; the mean or standing pressure of the mediums therein; and by controlling the frequency of the wave generator 10. In any event, it will be evident that when these proportions and characteristics are so determined and attained, the compression phase of the wave will be maintained more or less continuously in the branch conduit 14, and thus will permit the continuous introduction of heat energy from a heat exchanger 28 directly thereinto. Similarly, heat energy may be extracted by the cooler 13 from the rarefaction phase which is maintained more or less continuously in the branch conduit 16.

As aforesaid, an introduction of heat energy into the wave-carrying medium of the conduit 14 may be effected in a large variety of ways. When the wave therein is in its compression phase, any continuous source of heat will be effective to introduce energy into the wave. Shown in FIGURES 2–4 are different manners in which this heat exchange may be effectuated.

Thus, in FIGURE 2, there is disclosed a conduit portion 30 which may be an intermediate portion of the branch conduit 14 shown in FIGURE 1. A heat exchanger 32, which may be the heat exchanger diagrammatically and generically indicated 28 in FIGURE 1, is shown as comprising preferably a cylindrical drum enclosing and/or in heat exchange relation with the conduit portion 30. A plurality of tubes 34 extend through the drum 32 and also through the conduit portion 30. A source of heat is applied to the interior of these tubes in any desired manner, as, for example, by passing combustion products or other heated fluid medium therethrough, and the tubes 34, in turn, directly conduct and transmit their heat energy into the medium passing through the conduit portion 30, and which thus surrounds the tubes. In this form of the invention, therefore, heat as energy is directly introduced into and heats the wave propagating medium on the compression phase of the latter and the conduit portion 30 by direct heat exchange or conduction.

In the modified construction of FIGURE 3, the conduit portion 30 is likewise surrounded by the heat exchanger's cylindrical drum-like casing 32. However, an electrical heating coil 36 is disposed in the casing 32 and surrounds the conduit portion 30, this heating coil being supplied by electrical energy from any desired source, not shown. If desired, the casing 32 may be filled with a liquid or other heat conducting medium to facilitate transfer of the energy from the coil 36 to this adjacent surrounded portion of the conduit 30 for heating the same. The coil 36 may thus function as conventional electric conductive type of heater; or may be of an inductive type for inducing through a high frequency electric current heat energy in the surface of the conduit 30 from whence the heat energy is discharged by conduction into the wave-carrying medium within the conduit.

A still further method of heat exchange is disclosed in FIGURE 4, wherein the conduit portion 30 is surrounded by the cylindrical drum-like casing 32. In this arrangement, however, dielectric heating is effected. For that purpose, a pair of electrodes 38 and 40 are insulatingly mounted within the interior of the conduit portion 30 and have their opposite extremities connected to electric conductors 42 and 44 which in turn form part of an electrical circuit, not shown. Any desired number of these electrodes or resistance elements may be provided. In this arrangement, the flow of current passing through the high resistance of the dielectric material 38 is converted into heat which in turn is given by conduction into the medium within the conduit portion 30.

It will also be understood that in some instances the electrode 38 and 40 may be connected to the opposite sides of the electrical circuit whereby the fluid itself in the conduit passing between the electrodes constitutes the dielectric material to be heated by the flow of current.

In the form of the invention shown in FIGURE 1, therefore, it is evident that a continuous source of heat may be utilized to introduce heat energy into the energy content of an energy-carrying wave, by means of heat exchange with the wave-propagating medium at a portion which is continuously at the compression phase of the wave.

In the operation as above set forth, it has been assumed that the apparatus and method are functioning to add energy into the wave. However, by reversing the arrangement, energy may be withdrawn from the wave. Thus, by placing the heating and cooling devices, either alone or together, upon the rarefaction and compression conduits 16 and 14, respectively, the devices will each decrease the wave's energy content.

This embodiment of the invention may thus function as a means for receiving energy from an energy wave; and the entire assembly, by virtue of this reversibility of operation, is inherently ideally adapted to perform as a heater or cooler for air conditioning or other purposes.

In all of the forms of the invention hereinbefore disclosed, it should be noted that any heat energy not converted into wave energy will be applied to the medium and/or the formation in the form of sensible heat whereby beneficial results may be obtained.

In general, therefore the embodiments disclosed present processes and means for continuously applying heat energy to and/or withdrawing heat energy from an energy wave for controlling the characteristics of the same.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An apparatus for increasing the energy content of an energy carrying wave in a wave-propagating medium comprising a pair of conduits containing a wave-propagating medium, a wave generator means coupling said wave generator in split phase to said conduits thereby producing and maintaining the compression phase of the wave in one conduit, and the rarefaction phase of the wave in the other conduit, means directly applying heat into the medium in one of said conduits to thereby vary the energy content of the energy-carrying wave.

2. The combination of claim 1 including means operatively connecting said conduits to an oil bearing formation for applying the energy wave thereto.

3. The combination of claim 1 including means preventing reverse flow in each of said conduits.

4. The combination of claim 1 wherein said heat applying means comprises a plurality of tubes containing a heating fluid therein and having heat exchange relation with the medium in said conduit maintaining said compression phase.

5. The combination of claim 1 wherein said heat applying means comprises an electric heating coil surrounding said conduit maintaining said compression phase.

6. The combination of claim 1 wherein said heat applying means comprises a pair of electrodes disposed in the medium of said conduit maintaining said compression phase and separated by said medium.

7. An apparatus for increasing the energy content of an energy carrying wave comprising first and second conduits each containing a wave propagating medium, a wave generator for producing an energy bearing wave, control means alternatively connecting said generator to said conduits whereby the generator will be connected to the first conduit when the wave is on its compression phase and to the second conduit when the wave is on its rarefaction phase, means for applying heat to said first conduit to introduce energy into the energy carrying wave.

8. An apparatus for increasing the energy content of an energy wave comprising a pair of conduits each containing a wave-propagating medium, a wave generator for producing an energy wave, control means for alternatively connecting said generator to said conduits whereby the generator will be connected to alternate conduits on the compression and rarefaction phases of the energy wave, means for applying heat to the conduits having the compression phase of the wave.

9. The combination of claim 8 including means operatively connecting said conduits to an oil bearing formation for applying the energy wave thereto.

10. An apparatus for varying the energy content of an energy-carrying wave in a wave propagating medium comprising a main conduit containing a wave propagating medium, said main conduit having a pair of branch conduits therein disposed in parallel relation, a wave generator, means coupling said wave generator to said main and branch conduits whereby the phases of an energy wave are split, with the compression phase being generated in one branch conduit and the rarefaction phase in the other branch conduit, means for applying heat to the medium in one of said branch conduits to vary the energy contact of an energy wave produced by said generator.

11. A process for increasing the energy content of an energy-carrying medium comprising dividing the medium into two components, producing an energy-carrying wave in both said components but with its compression phase in one component and with its rarefaction phase in the other component and applying heat directly to the medium in one of said components whereby to vary the energy content of the energy-carrying wave.

12. The process of claim 11 including the step of operatively connecting the medium to an oil bearing formation for applying the energy wave thereto.

13. A method of increasing the energy content of a wave comprising dividing a transmitting medium into two proportions, alternatively coupling a wave generator to said portions whereby the generator will be coupled to one portion on the compression phase of a wave and to the other portion on the rarefaction phase of the wave, and applying heat energy to said medium in one of said portions.

14. The method of claim 13 including the step of operatively connecting the medium to an oil bearing formation for applying the energy wave thereto.

15. A method of increasing the energy content of a wave comprising dividing a transmitting medium into two portions, alternately coupling a wave generator to said portions whereby the generator will be coupled to one portion on the compression phase of a wave and to the other portion on the rarefaction phase of the wave, and removing heat energy from said medium in one of said portions.

16. The method of claim 15 including the step of operably connecting the medium to an oil bearing formation for applying the energy wave thereto.

17. A method of increasing the energy content of a wave comprising dividing a transmitting medium into two portions, alternately coupling a wave generator to said portions whereby the generator will be coupled to one portion on the compression phase of a wave and to the other portion on the rarefaction phase of the wave, applying heat energy to said medium in said one portion, and removing heat energy from said medium in said other portion.

18. The method of claim 17 including the step of operably connecting the medium to an oil bearing formation for applying the energy wave thereto.

References Cited by the Examiner

UNITED STATES PATENTS

| | | | |
|---|---|---|---|
| Re. 23,381 | 6/1951 | Bodine | 166—43 |
| 2,284,764 | 6/1942 | Parks | 165—27 X |
| 2,501,954 | 3/1950 | McKechnie et al. | 219—69 |
| 2,549,464 | 4/1951 | Hartley | 60—24 X |
| 2,581,902 | 1/1952 | Bodine. | |
| 2,654,580 | 10/1953 | Shaw | 165—27 |
| 2,667,932 | 2/1954 | Bodine | 166—177 X |
| 2,670,801 | 3/1954 | Sherborne | 166—177 X |
| 2,796,129 | 6/1957 | Brandon | 166—177 X |
| 2,836,033 | 5/1958 | Marrison | 116—137 |
| 2,866,509 | 12/1958 | Brandon | 166—177 |
| 3,057,758 | 10/1962 | Walker et al. | 166—224 X |
| 3,141,099 | 7/1964 | Brandon | 166—42 X |

CHARLES E. O'CONNELL, *Primary Examiner.*